United States Patent [19]

Martelli et al.

[11] Patent Number: 4,743,167

[45] Date of Patent: May 10, 1988

[54] DEVICES FOR THE SORPTION, STORAGE AND RELEASE OF HYDROGEN ISOTOPES

[75] Inventors: Daniele Martelli; Fabrizio Doni; Claudio Boffito, all of Milan, Italy

[73] Assignee: S.A.E.S. Getters S.p.A., Milan, Italy

[21] Appl. No.: 863,941

[22] Filed: May 16, 1986

[30] Foreign Application Priority Data

May 24, 1985 [IT] Italy ................................ 20881 A/85

[51] Int. Cl.$^4$ ............................................. F04B 37/02
[52] U.S. Cl. .................................. 417/51; 423/648 A; 423/248
[58] Field of Search ..................... 417/48, 51, 53, 572; 423/648 A, 248; 55/17

[56] References Cited

U.S. PATENT DOCUMENTS 3,104,049  9/1963  Compton et al. .................... 417/51
3,963,826  6/1976  Anderson et al. ................... 423/248
4,055,276  10/1977 Solomon ................................ 222/3
4,163,666  8/1979  Shaltiel et al. ....................... 55/158
4,312,669  1/1982  Boffito et al. ...................... 420/422
4,360,445  11/1982 Mendelsohn et al. ............... 420/125

FOREIGN PATENT DOCUMENTS 907296   2/1982  U.S.S.R. ............................... 417/51
964227  10/1982  U.S.S.R. ............................... 417/51

Primary Examiner—Carlton R. Croyle
Assistant Examiner—Donald E. Stout
Attorney, Agent, or Firm—Quaintance, Murphy & Presta

[57] ABSTRACT

A device is described for the sorption of hydrogen isotopes at low pressures, their storage and their subsequent release at high pressures. Use is made of a getter material having linear sorption isotherms and a compressor material having non-linear sorption isotherms.

8 Claims, 3 Drawing Sheets

DEVICES FOR THE SORPTION, STORAGE AND RELEASE OF HYDROGEN ISOTOPES

BACKGROUND OF THE INVENTION

The three isotopes of hydrogen are hydrogen itself, deuterium and tritium ($H_2$, $D_2$ and $T_2$ respectively). They find ever increasing use in industry and research and as a consequence there is an increasing interest in the sorption, storage and release of these gases in a safe and controlled manner.

Such sorption, storage and release (SSR) devices are well known in the art and have, for instance, been described by D. E. Soloman in U.S. Pat. No. 4,055,276. While they are capable of sorbing hydrogen isotopes at low pressures and on heating, releasing the isotope at a higher pressure it is often the case that this higher pressure is still many orders of magnitude below that which is desired. Furthermore, the pressure at which the isotope is released varies during isotope release due to changes of the concentration of sorbed isotope within the isotope sorption material (getter). This is due to the fact that for many traditional getter materials the hydrogen isotope equilibrium presure (p) (i.e. the hydrogen isotope pressure outside the getter material and the hydrogen isotope pressure within the getter material) is related to the concentration (q) of hydrogen isotope within the getter material and the getter material temperature (T) by a relationship of the form:

$$\log p = A + \log q^2 - \frac{B}{T}$$

known as Sieverts' law.

Thus, whilst traditional hydrogen isotope sorption, storage and release (SSR) devices have the desirable feature of sorption at low isotope pressures they release the hydrogen isotope at pressures lower than those often required and even that pressure is not at a constant value but decreases drastically.

Materials which sorb hydrogen isotopes and release them at high pressures are also known. See for Example D. Shaltiel et al., Journal of the Less Common Metals, 53 (1977) 117–131. Nevertheless, such materials are not able to sorb significant quantities of hydrogen isotopes at low pressures. See also, U.S. Pat. Nos. 4,163,666 and 4,360,445.

OBJECTS OF THE PRESENT INVENTION

It is therefore an object of the present invention to provide a hydrogen isotope sorption, storage and release device free from one or more defects of prior sorption, storage and release devices.

It is a further object of the present invention to provide a hydrogen isotope sorption, storage and release device capable of isotope sorption at low pressures and isotope release at relatively high pressure.

Yet another object of the present invention is to provide a method for the sorption of hydrogen isotopes at low pressures and their release at a high and substantially constant pressure.

Further objects and advantages of the present invention will become clear to those skilled in the art by reference to the following description herewith and drawings wherein.

DETAILED DESCRIPTION OF THE INVENTION

The present invention is based on the use of a non-evaporable getter material which permanently sorbs active gases and reversibly sorbs hydrogen isotopes at low pressures and whose hydrogen isotope equilibrium pressure is analytically described by an equation of the form:

$$\log p = A + \log q^2 - \frac{B}{T}$$

where
p=hydrogen isotope equilibrium pressure in pascal
q=concentration of hydrogen isotope in the non-evaporable getter material in $Pa.m^3.kg^{-1}$
T=temperature of the non-evaporable getter in K
A, B=are constants which depend on the composition of the non-evaporable getter material and the hydrogen isotope, for hydrogen isotope concentrations in the non-evaporable getter material of less than $3 \times 10^3$ $Pa.m^3.kg^{-1}$; in combination with a non-evaporable compressor material having a non-linear log p versus log $q^2$ characteristic such that at ambient temperatures it is capable of sorbing hydrogen isotopes released by the getter material when the getter material is heated to elevated temperatures and which itself releases hydrogen isotopes upon heating at a substantially constant pressure higher than that at which the non-evaporable getter material releases the hydrogen isotope.

Figure 1:
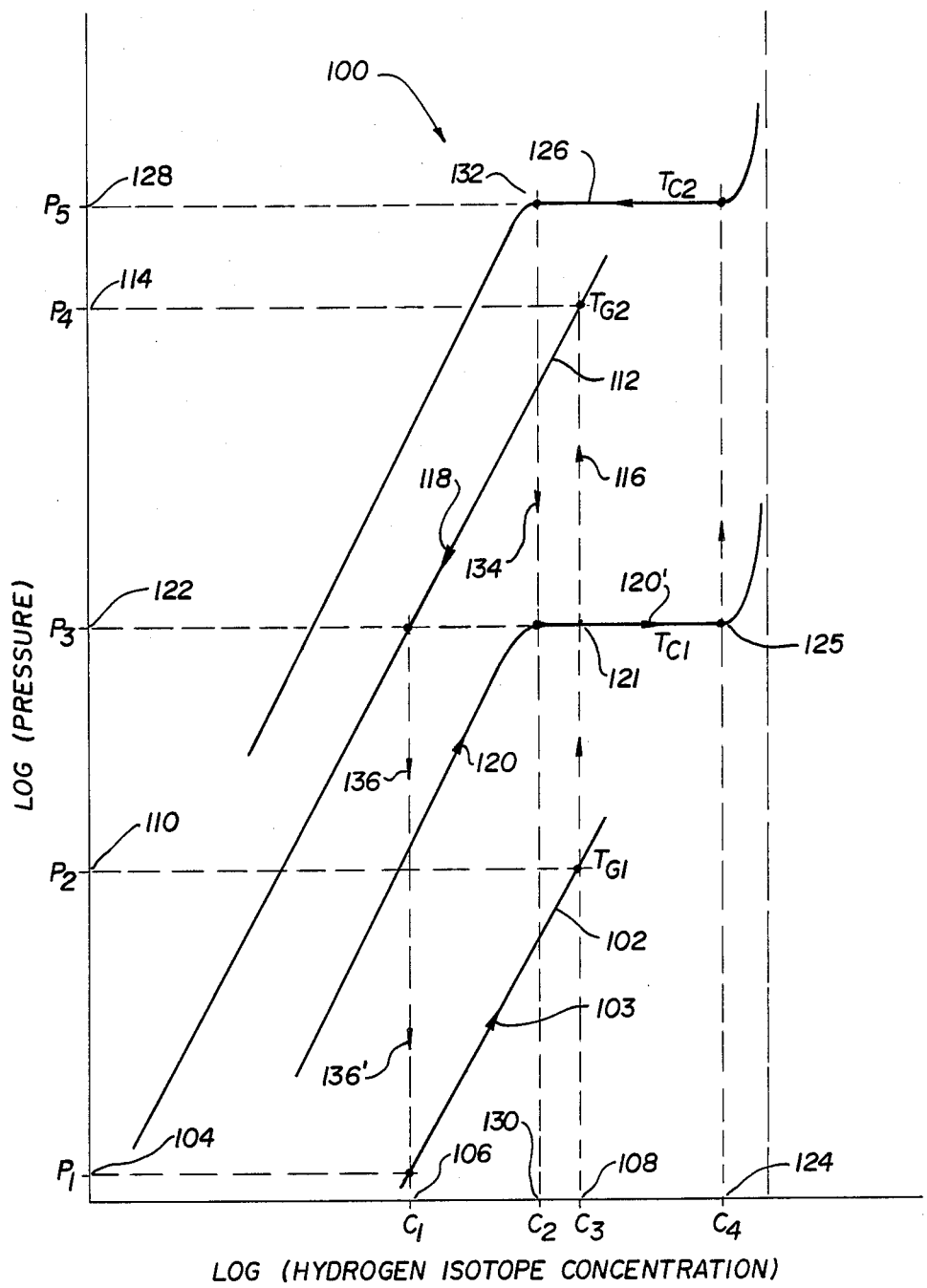
FIG. 1 is a not-to-scale representation of the isotherms relating to an SSR device of the present invention.

For a better understanding of the present invention reference is now made to FIG. 1 which shows a group of isotherms 100 relating to a hydrogen isotope chemical compressor and purifier of the present invention. Isotherm 102 shows the hydrogen isotope equilibrium pressure of a non-evaporable getter material which permanently sorbs active gases and reversibly sorbs hydrogen isotopes at a relatively low pressure and temperature. The getter material, having isotherm 102, is in an ambient where the hydrogen isotope has a pressure of $P_1$, as indicated at 104 and the concentration of the isotope already sorbed within the getter material is $C_1$ as indicated at 106. The temperature of the getter material is between approximately 0° C. and 100° C. As further quantites of the hydrogen isotope are produced within the ambient the getter material continues to sorb the isotope until the concentration of the hydrogen isotope within the getter material is $C_3$ as indicated at 108 and the isotope pressure has increased to $P_2$ as indicated at 110 by following isotherm 102 according to arrowhead 103.

Isotherm 102 (also indicated at $T_{G1}$) is analytically described by an equation of the form:

$$\log p = A + \log q^2 - \frac{B}{T}$$

where
p=hydrogen isotope equilibrium pressure in pascal q = concentration of hydrogen isotope in the non-evaporable getter material in $Pa.m^3.kg^{-1}$ T = temperature of the non-evaporable getter material in K A,B = are constants which depend on the composition of the non-evaporable getter material and the hydrogen isotope.

In the above equation the values of A and B are determined by a method described by F. Ricca and T. A. Giorgi in Journal of Physical Chemistry, Vol. 71, No. 11 October 1967, p. 3627–3631. Typical values are shown in the tables below.

| 84% Zr—16% Al | | 0–100° C. | | 70% Zr—24.6% | | 5.4% Fe 0-100° C. |
|---|---|---|---|---|---|---|
| | A | | B | | A | B |
| $H_2$ | 2.6 ± 0.3 | | −7200 ± 200 $H_2$ | | 2.9 ± 0.3 | −6180 ± 100 |
| $D_2$ | 3.0 ± 0.2 | | −7260 ± 100 $D_2$ | | 3.0 ± 0.2 | −6327 ± 100 |

Values for $T_2$ have not been determined but it is reported that its equilibrium pressure in approximately 4 times that of $H_2$.

When the hydrogen isotope pressure has reached the value of $P_2$ (110) the temperature of the getter material is raised to a higher temperature between about 500° C. and 900° C.

The non-evaporable getter material now obeys an isotherm 112 ($T_{G2}$) and the equilibrium pressure of the hydrogen isotope is $P_4$, as indicated at 114, following the change indicated by arrowhead 116. The getter material is now exposed to a non-evaporable compressor material having a non-linear log p versus log $q^2$ characteristic such that at ambient temperatures it is capable of sorbing hydrogen isotopes released by the getter material when the getter material is heated to elevated temperatures and which itself released hydrogen isotopes upon heating at a substantially constant pressure higher than that at which the non-evaporable getter material released the hydrogen isotope.

The compressor material is at a temperature of about from 0° C. to 100° C.

The getter material releases the hydrogen isotope following arrowhead 118 until all the hydrogen isotope released by the getter material has been sorbed by the compressor material. Thus, the concentration of the isotope in the getter material decreases whereas the concentration of the isotope in the compressor material increases following arrowheads 120, 120', on the compressor material isotherm 121. A point is reached when the equilibrium pressures of the getter material and the compressor material are equal at a value of $P_3$ as indicated at 122 where the concentration of the isotope in the getter material is again $C_1$ but the concentration in the compressor material is $C_4$ as indicated at 124 (and 125 on isotherm 121).

The compressor material is now heated to a higher temperature $T_{C2}$ between about 150° C. and 350° C. and its isotherm becomes that indicated by 126. The hydrogen isotope equilibrium pressure is now $P_5$ as indicated at 128. The compressor material can now release the hydrogen isotope at an approximately constant pressure compressure material has been reduced to a value of $C_2$ as indicated at 130 and 132 (on isotherm 126).

After the compressor material has released its hydrogen isotope it is allowed to cool down and it reassumes isotherm 121 following arrowhead 134. The getter material is also allowed to cool down from $T_{G2}$ to $T_{G1}$ following arrowheads 136,136' whereupon the compression cycle can be repeated.

Typical pressures are:

$P_1$ = from about $10^{-7}$ Pa to about $10^{-3}$ Pa;
$P_2$ = from about $10^{-4}$ Pa to about $10^{-2}$ Pa;
$P_3$ = from about 1 Pa to about $10^3$ Pa;
$P_4$ = from about 10 Pa to about $10^4$ Pa;
$P_5$ = from about $10^3$ Pa to about $2.10^5$ Pa.

Typical concentration is:

$C_1$ = from about 10 $Pa.m^3.kg^{-1}$ to about $10^2$ $Pa.m^3.kg^{-1}$;
$C_2$ = from about $10^2$ $Pa.m^3.kg^{-1}$ to about $3 \times 10^3$ $Pa.m^3.kg^{-1}$;
$C_3$ = from about $10^3$ $Pa.m^3.kg^{-1}$ to about $4 \times 10^3$ $Pa.m^3.kg^{-1}$;
$C_4$ = from about $5 \times 10^3$ $Pa.m^3.kg^{-1}$ to about $10^4$ $Pa.m^3.kg^{-1}$.

Figure 2:
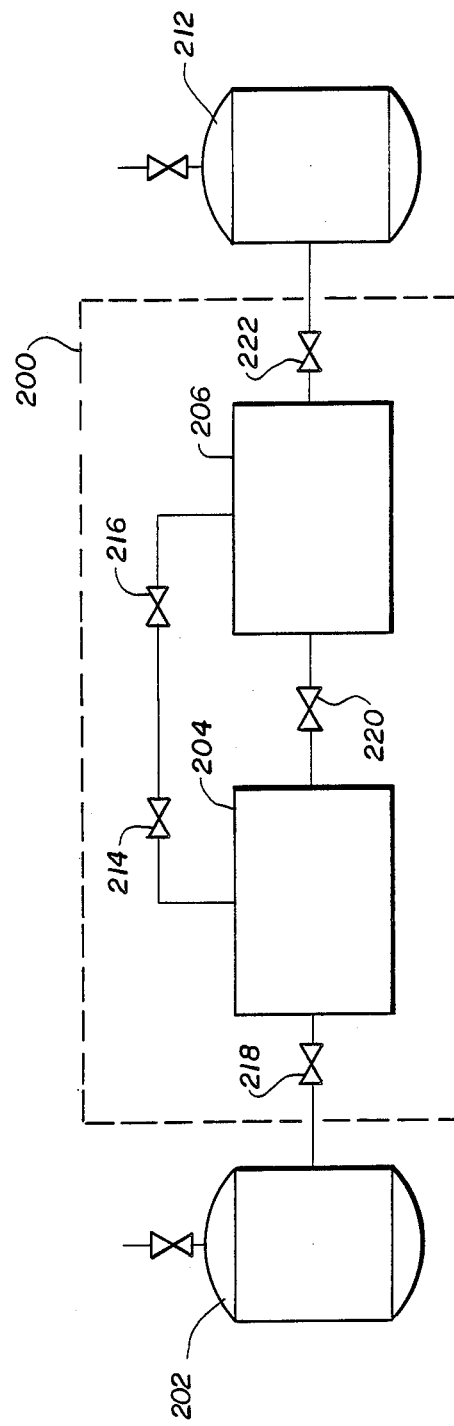
FIG. 2 is a schematic diagram of how an SSR device of the present invention is utilized in practice.

Referring now to FIG. 2 there is shown a device 200 for the sorption, storage and release of hydrogen isotopes together with other elements sometimes associated with the device 200. In practice it is convenient to dispose the getter material and compressor material within the device 200 in which there is a vessel 202 which is a source of low pressure hydrogen isotope having a partial pressure of about $10^{-7}$ to $10^{-3}$ Pa. A non-evaporable getter (NEG) material is contained in a first gas-tight container 204.

A non-evaporable compressor material is contained within a second gas-tight container 206. A pumping system comprising a backing (rotary) pump 208 and a turbomolecular pump 210 are connected to the containers 204 and 206. A hydrogen outlet or storage tank 212 is also provided. The various components are connected through valves 214, 216, 218, 220 and 222 ($V_1$, $V_2$, $V_3$, $V_4$ and $V_5$ respectively).

Consider all valves closed. Valve 214 is opened and after NEG container 204 is heated to activate the getter material contained therein. Valve 214 is closed. Compressor material contained within container 206 is also activated by heating after opening valve 216 which is then subsequently closed. Valve 218 is opened and the getter material in container 204 contacts and sorbs the hydrogen isotope produced in container 202. After sorption of the hydrogen isotope, valve 218 is closed and the getter material is heated releasing the hydrogen isotope but not other gaseous impurities. Value 220 is opened and compressor material in the container 206 sorbs the isotope at approximately room temperature. Valve 220 is then closed and when it is required to produce the purified hydrogen isotope at the required high pressure to storage tank 212, or whatever, the compressor material is heated to the temperature which is required to give that pressure, and valve 222 is opened.

Suitable non-evaporable getter materials are any getter materials which are capable of sorbing hydrogen isotopes at low pressures but preferably those which sorb up to $3 \times 10^3$ $Pa.m^3.kg^{-1}$ at about 25° C. at an equilibrium pressure of about $10^{-3}$ Pa. Examples of suitable getter materials are those chosen from the group consisting of Zr-Al alloys, Zr-Fe alloys, Zr-Ni alloys and Zr-$M_1$-$M_2$ alloys where $M_1$ is chosen from the group comprising Nb and V, and $M_2$ is chosen from the group consisting of Fe and Ni. Even more preferred getter materials are those ternary alloys whose composition in weight percent when plotted on a ternary composition diagram in weight percent Zr, weight percent V and weight percent Fe lies within a polygon having as its corners the points defined by:

(a) 75% Zr; 20% V; 5% Fe
(b) 45% Zr; 20% V; 35% Fe
(c) 45% Zr; 50% V; 5% Fe.

See FIG. 16 of U.S. Pat. No. 4,312,669. The most preferred getter material for use in the container 204 is a non-evaporable ternary gettering alloy whose composition in weight percent when plotted on a ternary composition diagram in weight percent Zr, weight percent V and weight percent Fe lies within a polygon having as its corners the points defined by:

(d) 70% Zr; 25% V; 5% Fe
(e) 70% Zr; 24% V; 6% Fe
(f) 66% Zr; 24% V; 10% Fe
(g) 47% Zr; 43% V; 10% Fe
(h) 47% Zr; 45% V; 8% Fe
(i) 50% Zr; 45% V; 5% Fe.

Suitable compressor materials are any compressor materials which have non-linear log p versus log q characteristic such that at ambient temperature it is capable of sorbing hydrogen isotopes released by the getter material when the getter material is heated to elevated temperatures and which itself releases hydrogen isotopes upon heating at a substantially constant pressure higher than that at which the non-evaporable getter material releases the hydrogen isotope. Example of such materials are Zr-V-Fe alloys and La-Ni-Al alloys, there are many others.

One preferred composition expecially useful as a compressor material in the second gas-tight container 206 is a ternary alloy of Zr, V and Fe whose composition lies within a certain polygon on a ternary weight percent diagram. That certain polygon is defined by three points. The first point is Zr=45%; V=20%; Fe=35%. The second point is Zr=60%; V=20%; Fe=20%. The third point is Zr=45%; V=35%; Fe=20%.

One preferred Zr-V-Fe compressor material has a composition $Zr(V_xFe_{1-x})_2$ where $0.4 < x < 0.6$.

Other preferred alloys are La-Ni-Al alloys such as La-$Ni_{3.5}$-$Al_{1.5}$.

Such alloys have the advantage that they release the hydrogen isotope at temperatures less than the temperature at which they would ignite if exposed to air and are thus much safer to use in practice.

It will be realized that the relative masses of non-evaporable getter material and compressor material can be used to optimize the performance of the chemical compressor.

EXAMPLE 1

Figure 3:
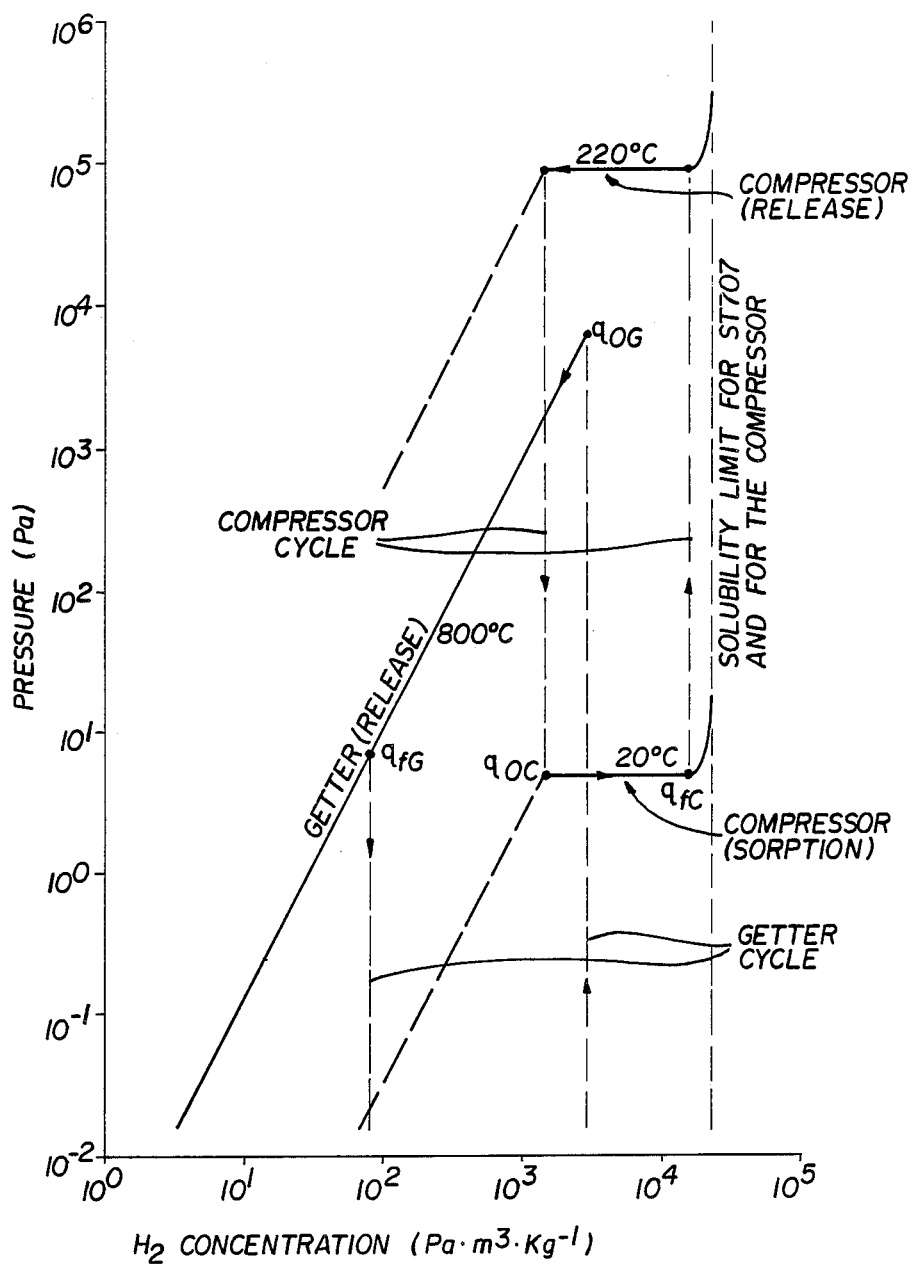
FIG. 3 is a practical realization of a hydrogen compressor using a device of the present invention.

In a non-limiting example of the present invention a Zr-V-Fe alloy of composition 70% Zr; 24.6% V; 5.4% Fe is used to sorb a Hydrogen isotope ($H_2$) at ambient temperature until $3 \times 10^3$ Pa.$m^3$.$kg^{-1}$ have been sorbed at a pressure of less than about $10^{-3}$ Pa. Its temperature is then raised to 800° C. whereupon a compressor material of composition La-$Ni_{3.5}$-$Al_{1.5}$ at ambient temperature sorbs the isotope until it has sorbed about $1.5 \times 10^4$ Pa.$m^3$ $kg^{-1}$. The compressor material is then heated to about 200° C. whereupon it releases hydrogen at a relatively constant pressure of about $10^{+5}$ Pa as shown in FIG. 3.

Thus the relative amounts of getter material (Mg) to compressor material (Mc) can be indicated as:

$$\frac{1.5 \times 10^4 \, Pa \cdot m^3 \cdot kg^{-1}}{3 \times 10^3 \, Pa \cdot m^3 \cdot kg^{-1}} \rightarrow \frac{Mg}{Mc} = 5.$$

EXAMPLE 2

The procedure of Example 1 is repeated except that the $H_2$ contacted with the Zr-V-Fe alloy is replaced by deuterium ($D_2$) contaminated with trace amounts of less than one percent of impurities, namely, oxygen, carbon monoxide and nitrogen.

The resultant $D_2$ released from the compressor material is substantially free of all impurities.

EXAMPLE 3

This example illustrates the structure of a device of the present invention for the sorption, storage and release of tritium.

A device is constructed as shown in FIG. 2 herein. Impure tritium contaminated with about one percent of oxygen and about one percent of nitrogen is located in the vessel 202.

A particulate alloy of 62% Zr; 30% V; 8% Fe is placed in the container 204. A particulate alloy of 50% Zr; 25% V; 25% Fe is placed in the container 206.

Pure tritium substantially free of oxygen and nitrogen issues past the value 222 into the vessel 212.

Although the invention has been described in considerable detail with reference to certain preferred embodiments thereof, it will be understood that variations and modifications can be effected within the spirit and scope of the invention as described above and as defined in the appended claims.

What is claimed is:

1. A device for the sorption, storage and release of hydrogen isotopes comprising:
   A. a first gas-tight container having therein non-evaporable getter material which permanently sorbs active gases and reversibly sorbs hydrogen isotopes at low pressures and whose hydrogen isotope equilibrium pressure is analytically described by an equation of the form;

$$\log p = A + \log q^2 - \frac{B}{T}$$

where
   p=hydrogen isotope equilibrium pressure in pascal
   q=concentration of hydrogen isotope in the non-evaporable getter material in Pa.$m^3$.$kg^{-1}$
   T=temperature of the non-evaporable getter material in K
   A,B=are constants which depend on the composition of the non-evaporable getter material and the hydrogen isotope,
   for hydrogen isotope concentrations in the non-evaporable getter material of less than $3 \times 10^3$ Pa.$m^3$.$kg^{-1}$; and
   B. an inlet in the first gas-tight container; and
   C. a second gas-tight container having therein a non-evaporable compressor material having a non-linear log p versus log $q^2$ characteristic such that at ambient temperatures it is capable of sorbing hydrogen isotopes released by the getter material when the getter material is heated to elevated temperatures and which itself releases hydrogen isotopes upon heating at a substantially constant pressure higher than that at which the non-evaporable getter material releases the hydrogen isotope; and D. a conduit between the first container and the second container; and E. a valve in the conduit; and F. an outlet for the second container.

2. A device for the sorption, storage and release of hydrogen isotopes comprising:

A. a first gas-tight container having therein a non-evaporable getter material which permanently sorbs active gases and reversibly sorbs hydrogen isotopes at low pressures and whose hydrogen isotope equilibrium pressure is analytically described by an equation of the form;

$$\log p = A + \log q^2 - \frac{B}{T}$$

where
p = hydrogen isotope equilibrium pressure in pascal
q = concentration of hydrogen isotope in the non-evaporable getter material in $Pa.m^3.kg^{-1}$
T = temperature of the non-evaporable getter material in K
A,B = are constants which depend on the composition of the non-evaporable getter material and the hydrogen isotope, for hydrogen isotope concentrations in the non-evaporable getter material of less than $3 \times 10^3$ $Pa.m^3.kg^{-1}$ and chosen from the group comprising Zr-Al alloys, Zr-Fe alloys, Zr-Ni alloys, Zr-$M_1$-$M_2$ alloys, where $M_1$ is chosen from the group comprising Nb and V and $M_2$ is chosen from the group comprising Fe and Ni; and B. an inlet in the first gas-tight container; and C. a second gas-tight container having therein a non-evaporable compressor material having a non-linear log p versus $q^2$ characteristic such that at ambient temperatures it is capable of sorbing hydrogen isotopes released by the getter material when the getter material is heated to elevated temperatures and which itself releases hydrogen isotopes upon heating at a substantially constant pressure higher than that at which the non-evaporable getter material releases the hydrogen isotope, chosen from the group comprising Zr-V-Fe alloys, La-Ni-Al alloys; and D. a conduit between the first container and the second container; and E. a valve in the conduit; and F. an outlet for the second container.

3. The device of claim 2 in which the getter material is a ternary alloy whose composition in weight percent when plotted on a ternary composition diagram in weight percent Zr, weight percent V and weight percent Fe lies within a polygon having as it corners the points defined by:
 (a) 75% Zr; 20% V; 5% Fe
 (b) 45% Zr; 20% V; 35% Fe
 (c) 45% Zr; 50% V; 5% Fe.

4. The device of claim 2 in which the compressor material has a composition Zr $(V_xFe_{1-x})_2$ where $0.4 < x < 0.6$.

5. The device of claim 2 in which the compressor material has a composition La $Ni_{3.5}Al_{1.5}$.

6. A device for the sorption, storage and release of hydrogen isotopes comprising:

A. a first gas-tight container having therein a non-evaporable ternary gettering alloy whose composition in weight percent when plotted on a ternary composition diagram in weight percent Zr, weight percent V and weight percent Fe lies within a polygon having as its corners the points defined by:
75% Zr; 20% V; 5% Fe
45% Zr; 20% V; 35% Fe
45% Zr; 50% V; 5% Fe; and B. a hydrogen isotope inlet in the first gas-tight container; and C. a second gas-tight container having therein a ternary compressor alloy whose composition in weight percent when plotted on a ternary composition diagram in weight percent Zr, weight percent V and weight percent Fe lies within a polygon having as its corners the points defined by:
45% Zr; 20% V; 35% Fe
60% Zr; 20% V; 20% Fe
45% Zr; 35% V; 20% Fe; and D. a conduit between the first container and the second container; and E. a valve in the conduit; and F. a hydrogen isotope outlet for the second container.

7. A device for the sorption, storage and release of hydrogen isotopes comprising:

A. a first gas-tight container having therein a non-evaporable ternary gettering alloy whose composition in weight percent when plotted on a ternary composition diagram in weight percent Zr, weight percent V and weight percent Fe lies within a polygon having as its corners the points defined by:
75% Zr; 20% V; 5% Fe
45% Zr; 20% V; 35% Fe
45% Zr; 50% V; 5% Fe; and B. a hydrogen isotope inlet in the first gas-tight container; and C. a second gas-tight container having therein a compressor alloy of the composition $LaNi_{3.5}Al_{1.5}$; and D. a conduit between the first container and the second container; and E. a valve in the conduit; and F. a hydrogen isotope outlet for the second container.

8. A method for the sorption of hydrogen isotope at low pressure and the release of the hydrogen isotope at a higher pressure comprising the steps of:

A. contacting the hydrogen isotope with a non-evaporable getter material which permanently sorbs active gases and reversibly sorbs hydrogen isotopes at low pressures and whose hydrogen isotope equilibrium pressure is analytically described by an equation of the form:

$$\log p = A + \log q^2 - \frac{B}{T}$$

where
p = hydrogen isotope equilibrium pressure in pascal
q = concentration of hydrogen isotope in the non-evaporable getter material in $Pa.m^3.kg^{-1}$
T = temperature of the non-evaporable getter material in K
A,B = are constants which depend on the composition of the non-evaporable getter material and the hydrogen isotope, for hydrogen concentrations in the non-evaporable getter material of less than $3 \times 10^3$ Pa.m$^3$.kg$^{-1}$; and then B. increasing the temperature of the getter material to cause hydrogen isotope release; and then C. contacting the hydrogen isotope with a non-evaporable compressor material having a non-linear log p versus log q$^2$ characteristic such that at ambient temperatures it is capable of sorbing hydrogen isotopes released by the getter material when the getter material is heated to elevated temperatures and which itself releases hydrogen isotopes upon heating at a substantially constant pressure higher than that at which the non-evaporable getter material releases the hydrogen isotope.

* * * * *